(12) United States Patent
Doran et al.

(10) Patent No.: US 6,738,542 B1
(45) Date of Patent: May 18, 2004

(54) OPTICAL FIBRE COMMUNICATION SYSTEM

(75) Inventors: Nicholas John Doran, Coventry (GB); Jeroen Henricus Bernardus Nijhof, Birmingham (GB)

(73) Assignee: BTG International Limited, London (GB)

( * ) Notice: Subject to any disclaimer, the term of this patent is extended or adjusted under 35 U.S.C. 154(b) by 0 days.

(21) Appl. No.: 09/494,246

(22) Filed: Jan. 31, 2000

(30) Foreign Application Priority Data

Jul. 30, 1997 (GB) .............................................. 9802291
Jul. 31, 1997 (GB) .............................................. 9716230

(51) Int. Cl.$^7$ ................................................ G02B 6/28
(52) U.S. Cl. ........................................ 385/24; 385/123
(58) Field of Search .................................. 385/24, 123

(56) References Cited

U.S. PATENT DOCUMENTS

| | | | |
|---|---|---|---|
| 4,778,237 A | 10/1988 | Sorin et al. ............... 350/96.15 |
| 5,343,322 A | 8/1994 | Pirio et al. .................... 359/173 |
| 5,471,333 A | 11/1995 | Taga et al. ................... 359/173 |
| 5,488,620 A | 1/1996 | Minden ....................... 372/18 |
| 5,508,845 A | 4/1996 | Frisken ....................... 359/161 |
| 5,513,194 A | 4/1996 | Tamura et al. ................. 372/6 |
| 5,559,910 A | 9/1996 | Taga et al. ..................... 385/24 |
| 5,574,590 A | 11/1996 | Edagawa et al. ............. 359/161 |
| 5,577,057 A | 11/1996 | Frisken ........................ 372/18 |
| 5,612,808 A | 3/1997 | Audouin et al. ............. 359/161 |
| 5,629,795 A | 5/1997 | Suzuki et al. ................ 359/337 |
| 5,680,491 A | 10/1997 | Shigematsu et al. .......... 385/24 |
| 5,764,841 A | 6/1998 | Iwatsuki et al. ............. 385/123 |
| 5,798,853 A | 8/1998 | Watanabe .................... 359/160 |
| 5,828,478 A | 10/1998 | Thomine et al. ............. 359/181 |
| 5,887,105 A * | 3/1999 | Bhagavatula et al. ........ 385/123 |
| 5,898,716 A | 4/1999 | Ahn et al. ...................... 372/6 |
| 5,905,825 A | 5/1999 | Brindel et al. ................. 385/24 |
| 6,097,524 A | 8/2000 | Doran et al. ................. 359/179 |
| 6,122,088 A * | 9/2000 | Hasegawa .................... 359/188 |
| 6,137,604 A | 10/2000 | Bergano ...................... 359/124 |
| 6,243,181 B1 | 6/2001 | Golovchenko et al. ...... 359/161 |
| 6,321,015 B1 | 11/2001 | Doran et al. ................. 385/123 |
| 6,433,923 B2 * | 8/2002 | Tanaka et al. .............. 359/337 |
| 6,442,320 B1 * | 8/2002 | Danziger et al. ........... 174/267 |

FOREIGN PATENT DOCUMENTS

| | | | |
|---|---|---|---|
| EP | 0 609 129 A1 | 8/1994 | ........... H04B/10/18 |
| EP | 0 777 347 A | 6/1997 | |
| EP | 0 777 347 A2 | 6/1997 | |
| EP | 0 777 347 A3 | 4/1998 | |
| EP | 0 846 977 A2 | 6/1998 | ............. G02F/1/35 |
| GB | 2271236 A | 4/1994 | ........... H04B/10/18 |
| GB | 2 227 651 A | 11/1994 | ........... H04B/10/18 |
| GB | 2 279 838 A | 1/1995 | ........... H04B/10/18 |
| JP | 2-96120 | 4/1990 | ............. G02F/1/35 |
| WO | WO 98/36512 | 8/1998 | ........... H04B/10/00 |

OTHER PUBLICATIONS

Suzuki, M. et al., Reduction of Gordon–Haus Timing Jitter by Periodic Dispersion Compensation in Soliton Transmission, *Electronics Letters* 31, 2027–2029 (1995).*

Smith, N. J. et al., Enhanced power solitons in optical fibres with periodic dispersion management, *Electronic Letters* 32, 54–55 (1996).*

Smith, N. et al., Reduced Gordon–Haus Jitter due to Enhanced Power Solitons in Strongly Dispersion Managed Systems, *Electronic Letters* 22, 2085–2086 (1996).*

(List continued on next page.)

*Primary Examiner*—Hung N. Ngo
(74) *Attorney, Agent, or Firm*—Morgan, Lewis & Bockius, LLP

(57) ABSTRACT

A soliton or soliton-like pulse-based optical communication system comprises a length of optical fibre divided into a plurality of sections arranged so that the average dispersion of the length of fibre is significantly different from the dispersion of each section.

32 Claims, 9 Drawing Sheets

OTHER PUBLICATIONS

Smith, N. J. et al., Energy–scaling characteristics of solitons in strongly dispersion–managed fibers, *Optics Letters* 21, 1981–1983 (1996).*

Nakazawa, N. et al., Nonlinear Pulse Transmission Through an Optical Fiber at Zero–Average Group Velocity Dispersion, *IEEE Photonics Technology Letters* 8, 452–454 (1996).*

Zhang, C. et al., Optical Soliton Propagation in a Positively and Negatively Dispersion–allocated Fiber *Communication Technology Proceedings,* ICCT 1, 319–322 (1996).*

Golovchenko, E. A. et al., Collision–induced timing jitter reduction by periodic dispersion management in soliton WDM transmission, *Electronics Letters* 33, 735–737 (1997).*

Nakazawa M et al: "Nonlinear Pulse Transmission through an optical fiber at zero–average group velocity dispersion" IEEE Photonics Technology Letters, vol. 8, No. 3, Mar. 1996, pp. 452–454, XP002086273.

Zhang et al: "Optical Soliton Propagation in Positively and Negatively dispersion–allocated Fiber" Communication Technology Proceedings, ICCT. vol. 1, May 5–7, 1996, pp. 319–322, XP002086274.

Golovchenko E A et al: "Collision–induced Timing Jitter Reduction by Periodic Dispersion Management in Soliton WDM Transmission" Electronic Letters, vol. 33, No. 9, Apr. 24, 1997, pp. 735–737, XP000695258.

Suzuki, M., Morita, I., Edagawa, N., Yamamoto, S., Taga, H., and Akiba, S., "Reduction of Gordon–Haus timing jitter by periodic dispersion compensation in soliton transmission", Electron. Lett., 1995, 31, (23), pp. 2027–2029.

Smith N J, Knox, F M, Doran N J, Blow K J, and Bennion I, "Enhanced power solitons in optical fibres with periodic dispersion management" *Electron Lett,* 1966, 32 (1), pp54–55.

Smith N J, Forysiak W, and Doran N J, "Reduced Gordon–Haus jitter due to enhanced power solitons in strongly dispersion managed systems", Electron Lett, 1996, 32 (22), pp2085–2086.

S.B. Alleston, P. Harper, I.S. Penketh, I. Bennion, and N.J. Doran, INSPEC Abstract No.: A2000–02–4280S–032, B2000–01–6260F–038: "1200 km propagation of 40 Gbits/single channel RZ data over dispersion managed standard (non–dispersion shifted) fibre", Cat. No. 99CH36322 (1999).

S.B. Alleston, P. Harper, I.S. Penketh, I. Bennion, and N.J. Doran, INSPEC Abstract No.: B1999–03–6260M–005: "40 Gbit/s single channel dispersion managed pulse propagation in standard fibre over 509 km", *Electronics Letters,* vol. 35, No. 1 (Jan. 7, 1999), pp. 57–59.

S.B. Alleston, P. Harper, I.S. Penketh, I. Bennion, N.J. Doran, and A.D. Ellis, INSPEC Abstract No.: B1999–06–6260M–059, "40 Gbit/s soliton transmission over dispersion managed standard fibre links", IEE Colloquium on High Speed and Long Distance Transmission (Ref. No. 1999/022) (1999), pp. 2/1–2/4.

S.B. Alleston, P. Harper, I.S. Penketh, I. Bennion, N.J. Doran, and A.D. Ellis, INSPEC Abstract No.: B1999–08–6260F–001: "1000 km transmission of 40 Gbit/s single channel RZ data over dispersion managed standard (non–dispersion shifted) fibre" *Electronic Letters,* vol. 35, No. 10 (May 13, 1999), pp. 823–824.

S. Alleston, I. Penketh, P. Harper, A. Niculae, I. Bennion, and N.J. Doran, INSPEC Abstract No.: B1999–12–6260–005: "16000 KM 10 Gbits$^{-1}$ soliton transmission over standard fibre by reduction of interactions through optimum amplifier positioning", Cat. No. 99CH36322, vol. 2 (1999), pp. WC4–1/41–WC4–3/43.

A. Berstron, D. Anderson, N.J. Doran, W. Forysiak, and J.H.B. Nijhof, INSPEC Abstract No.: B9812–6260–227: "Power dependence and accessible bandwidth for dispersion–managed solitons in asymmetric dispersion maps", *Electronics Letters,* vol. 34, No. 21 (Oct. 15, 1998), pp. 2054–2056.

A. Bernston, N.J. Doran, W. Forysiak, and J.H.B. Nijhof, INSPEC Abstract No.: A9818–4265S–003, B9809–4340–086, "Power dependence of dispersion–managed solitons for anomalous, zero, and normal path–average dispersion", *Optics Letters,* vol. 23, No. 12 (Jun. 15, 1998), pP. 900–902.

K.J. Blow and N.J. Doran, Genuine Article No. EW885, "Solitons across the Atlantic", *Physics World,* vol. 4, No. 2 (Feb. 1991), pp. 33–34.

N.J. Doran, W. Forysiak, J.H. B. Nijohf, A.M. Niculae, and A Bernston, Inside Conference Item ID: CN025778248: "Remarkable Features of DM Solitons: Implications for High Speed and WDM Systems", *New Trends in Optical Soliton Transmission Systems,* vol. 5 (1998), pp. 303–316.

N.J. Doran, W. Forysiak, J.H.B. Nijhof; and A. Niculae, 02503004 Inside Conference Item ID: CN026121447: "Remarkable properties of dispersion managed solitons", *OSA Technical Digest Series,* vol. 5(1998), p. WSB1.

N.J. Doran, W. Forysiak, N.J. Smith, and J.F.L. Devaney, E.I. No.: EIP97083773098: "Soliton dynamics in periodically varying dispersion systems", QELS '97 *IEEE,* Cat. No. 97CB36111, vol. 12, pp. 55–56.

N.J. Doran, W. Forysiak, N.J. Smith, F.M. Knox, and K.M. Allen, INSPEC Abstract No.: A9518–4265S–003, B9510–6260–024, "Design and soliton systems for optimum capacity", *Pure Appl. Opt.,* vol. 4 (Jul. 1995), pp. 271–279.

N.J. Doran, N.J. Smith, W. Forysiak, and F.M. Knox, Inside Conference Item ID: CN015687880: "Dispersion As Control Parameter in Soliton Transmission Systems", *Physics and Applications of Optical Solitons in Fibres '95,* vol. 3 (1996), pp. 1–14.

N.J. Doran, N.J. Smith, W. Forysiak, and F.M. Knox, "Dispersion as Control Parameter in Soliton Transmission Systems", Physics and Applications of Optical Solitons in Fibres '95: Proceedings of the Symposium held in Kyoto, Japan (Nov. 14–17, 1995).

N. Edagawa, I. Morita, M. Suzuki, Y. Yamamoto, H. Taga, and S. Akiba: "20 Gbit/s, 8100 km straight line single–channel soliton–based RZ transmission experiment using periodic dispersion compensation", Proc. 21st Eur. Conf. on Opt. Comm. (ECOC '95—Brussels), pp. Th.A.3.5/983–Th.A3.5/986.

A.D. Ellis, J.D. Cox, D. Bird, Regnault, J.V. Wright, and W.A. Stallard, "5 Gbit/s soliton propagation over 350 km with large periodic dispersion coefficient perturbations using erbium doped fiber repeaters", *Electronics Letters,* vol. 27, No. 10 (May 9, 1991), pp. 878–880.

W. Forysiak and N.J. Doran, Inside Conference Item ID: CN000566111: Stepwise dispersion profiling of periodically amplified systems, *Technical Digest Series*—Optical Society of America (OSA), vol. 15 (1993), pp. TuA4–1/170–TuA4–4/173.

W. Forysiak and K.J. Blow, and N.J. Doran, INSPEC Abstract No.: B9310–6260–036: "Reduction of Gordon–Haus jitter by post–transmission dispersion compensation", *Electronics Letters,* vol. 29, No. 13 (Jun. 24, 1993), pp. 1225–1226.

W. Forysiak, J.F. L. Devaney, N.J. Smith, and N.J. Doran, INSPEC Abstract No.: A9714–4281–008, B9707–6260–082: "Dispersion management for wavelength–division–multiplexed soliton transmission", *Optical Letters,* vol. 22, No. 9 (May 1, 1997), pp. 600–602.

J.F.L. Devaney, Y. Forysiak, N.J. Smith, and N.J. Doran, INSPEC Abstract No.: B9808–6260–180: "WDM of enhanced power solitons in strongly dispersion–managed systems", *OFC '97 Technical Digest,* vol. 6 (1997) (IEEE Cat. No. 97CH36049), pp. 306–307.

N.J. Doran, E.I. No. EIP02016818279: "Soliton communications systems: The concern is alive", Conference Proceedings—Lasers and Electro–Optics Society Annual Meeting LEOS, vol. 1, IEEE Cat. No. 01CH37242 (2001), pp. 214–215.

N.J. Doran, E.I. No.: EIP98044174957: "Dispersion–managed solitons: A new paradigm for high data rate", *OFC '98 Technical Digest,* Conference on Optical Fiber Communications, IEEE, Piscataway, N.J., U.S.A. 98CH36177, p. 265.

N.J. Doran, Genuine Article No. HC722, "Solitons the key to global cheap–talk", *Physics World* (Feb. 1992), vol. 5, No. 2, p. 25.

N.J. Doran, Inside Conference Item ID: CN008356099, "Nonlinear Phenomena in Optical Fibres", *NATO ASI Series E Applied Sciences,* vol. 289 (1995), pp. 75–102.

N.J. Doran, INSPEC Abstract No.: A1999–14–4280S–012, B1999–07–6260M–024: "Dispersion managed soliton systems", ECOC '98 (IEEE Cat. No. 98TH88398), vol. 1 (Sep. 20–24, 1998), pp. 97–99.

N.J. Doran, INSPEC Abstract No.: A86090313, B86048178: "Nonlinear pulse propagation in optical fibres", *IOCC—ECOC '85,* vol. 2 (1985), pp. 157–164.

N.J. Doran, INSPEC Abstract No.: A9421–4282–014, B9411–4125–034: "All–optical control and future opportunities for ultra high speed transmission on optical fibres", *EFOC & N '94,* Aston Univ., Birmingham, U.K. (1994), pp. 5–7.

N.J. Doran and K.J. Blow, INSPEC Abstract No.: A84049551, B84025386: "Solitons in optical communications", *IEEE Journal of Quantum Electronics* vol. QE–19, No. 12 (Dec. 1983), pp. 1883–1888.

N.J. Doran and W. Forysiak, INSPEC Abstract No.: A9404–4265F–015, B9402–4340–092: "Optimizing the capacity of soliton systems", *IEEE Colloquium on 'Ultra–Short Optical Pulses',* Digest No. 1993/202 (1993), p. 10/1–2.

N.J. Doran and W. Forysiak, INSPEC Abstract No.: A9518–4265S–012, B9510–4340–083: "Phase conjugation for jitter and soliton—soliton compensation in soliton communications", CLEO '94, Summaries of Papers Presented at the Conference on Lasers and Electro–Optics, Technical Digest Series, Conference Edition (Cat. No. 94CH3463–7), vol. 8 (1994), pp. 367–368.

N.J. Doran, W. Forysiak, P. Harper, S.B. Alleston, S.K. Turitsyn, and D. Govan, INSPEC Abstract No.: A2000–02–4281–021, B2000–01–4125–102: "The dispersion management of silitons", ACOFT/AOS '99, pp. 5–9.

N.J. Doran, W. Forysiak, F.M. Knox, N.J. Smith, and I Bennion, INSPEC Abstract No.: A9610–4280S–003, B9605–6260–186: "Optimizing transmission capacity: long distance and terrestrial applications", *Phil. Trans. R. Soc. Lond. A,* vol. 354, No. 1708 (Mar. 15, 1996), pp. 679–694.

K.J. Blow and N.J. Doran, INSPEC Abstract No.: A82102951, B82059670, "High bit rate communication systems using non–linear effects", *Optics Communications,* vol. 42, No. 6 (Aug. 15, 1982), pp. 403–406.

K.J. Blow and N.J. Doran, INSPEC Abstract No.: B83040547, "Bandwidth limits of nonlinear (soliton) optical communications systems", *Electronic Letters,* vol. 19, No. 11 (May 26, 1983), pp. 429–430.

K.J. Blow and N.J. Doran, INSPEC Abstract No.: A84044149: "Global and local chaos in the pumped nonliner Schrödinger equation", *Physical Review Letters,* vol. 52, No. 7 (Feb. 13, 1984), pp. 526–529.

K.J. Blow and N.J. Doran, INSPEC Abstract No.: A850409959: "Multiple dark soliton solutions of the non–linear Schrödinger equation", *Physics Letters A,* vol. 107A, No. 2 (Jan. 14, 1985), pp. 55–58.

K.J. Blow and N.J. Doran, INSPEC Abstract No.: A850538890, "The asymptotic dispersion of soliton pulses in lossy fibres", *Optics Communications,* vol. 52, No. 5 (Jan. 1, 1985), pp. 367–370.

K.J. Blow and N.J. Doran: INSPEC Abstract No.: A87103907, B87054402, "Nonlinear effects in optical fibres and fibre devices", *IEE Proceedings,* vol. 134, Pt. J, No. 3 (Jun. 1987), pp. 138–144.

K.J. Blow and N.J. Doran, INSPEC Abstract No.: A91120943: "Average soliton dynamics and the operation of soliton systems with systems lumped amplifiers", *IEEE Photonics Technology Letters,* vol. 3, No. 4 (Apr. 1991), pp. 369–371.

K.J. Blow, N.J. Doran[1], and S.J.D. Phoenix, INSPEC Abstract No.: A9211–4265–001, "The soliton phase", *Optics Communications,* vol. 88, No. 2,3 (Mar. 15, 1992), pp. 137–140.

K.J. Blow, N.J. Doran, and D. Wood: INSPEC Abstract No.: A88043167, B88020371, "Trapping of energy into solitary waves and in amplified nonlinear dispersive systems", *Optics Letters,* vol. 12, No. 12 (Dec. 1987), pp. 1011–1013.

K.J. Blow, N.J. Doran, and D. Wood: INSPEC Abstract No.: A88060956, B88033651: "Generation and stabilization of short soliton pulses in the amplified nonlinear Schrödinger equation", *J. Opt. Soc. Am. B,* vol. 5, No. 2, (Feb. 1988), pp. 381–391.

V.J. Chen, P.K.A. Wai, and C.R. Menyuk, "Soliton fiber ring laser", *Optics Letters,* vol. 17, No. 16 (Mar. 15, 1992), pp. 417–419.

J.F. Devaney, W. Forysiak, and N.J. Doran, INSPEC Abstract No.: A9803–4265S–004, B9802–4340–021: "Soliton collisions in dispersion–managed WDM systems", ECOC '97, IEE Conference Publication No. 448, (Sep. 22–25, 1997), pp. 223–236.

J.F.L. Devaney, W. Forysiak, and N.J. Doran, INSPEC Abstract No.: B1999–07–6260M–022: "Reduction of collision induced timing jitter in multichannel soliton systems by dispersion management", ECOC '98, IEE Cat. No. 98TH8398, vol. 1 (Sep. 20–24, 1998), pp. 89–90.

J.F.L. Devaney, W. Forysiak, A.M. Niculae, and N.J. Doran, INSPEC Abstract No.: A9803–4280S–015, B9802–6260–024: "Soliton collisions in dispersion–managed wavelength–division–multiplexed systems", *Optics Letters,* vol. 22, No. 22 (Nov. 15, 1997), pp. 1695–1697.

J.F.L. Devaney, W. Forysiak, N.J. Smith, and N.J. Doran, INSPEC Abstract No.: B9706–6260–081: "Modeling WDM soliton transmission in dispersion–managed systems", IEE Colloquium on WDM Technology and Applications, Ref. No. 1997/036, (1997), vol. 19, pp. 4/1–4/4.

W. Forysiak and N.J. Doran, INSPEC Abstract No.: A9514–4280S–015, B9508–6260–034: "Reduction of Gordon–Haus jitter in soliton transmission systems by optical phase conjugates", *Journal of Lightwave Technology,* vol. 13, No. 5 (May 1995), pp. 850–855.

W. Forysiak, N.J. Doran, F.M. Knox, and K.J. Blow, INSPEC Abstract No.: A9514–4265S–002, B9508–4340–012 "Average soliton dynamics in strongly perturbed systems", *Optics Communications,* vol. 117 (May 15, 1995), pp. 65–70.

W. Forysiak, F.M. Knox, and N.J. Doran, INSPEC Abstract No.: A9408–4281–011, B9404–4125–026: "Average soliton propagation in periodically amplified systems with stepwise dispersion–profiled fiber", *Optics Letters,* vol. 19, No. 3 (Feb. 1, 1994), pp. 174–176.

W. Forysiak, F.M. Knox, and N.J. Doran, INSPEC Abstract No.: A9422–4265–012, B9411–4340–074: "Stepwise dispersion profiling of periodically amplified soliton systems", *Journal of Lightwave Technology,* vol. 12, No. 8 (Aug. 1994), pp. 1330–1337.

W. Forysiak, J.H.B. Nijhof, and N.J. Doran, INSPEC Abstract No.: A2000–16–4281–008, B2000–08–4125–043: Dispersion managed solitons: the key to terabit per second optical fiber communications systems, *Optics & Photonics News,* vol. 11, No. 5 (May 2000), pp. 35–39.

I.R. Gabitov and S.K. Tiritsyn, "Breathing Soliton in Cascaded Transmission System with Passive Dispersion Compensation", Physics and Applications of Optical Solitons in Fibres '95: Proceedings of the Symposium held in Kyoto, Japan (Nov. 14–17, 1995).

D.S. Govan, W. Forysiak, and N.J. Doran, Inside Conference Item ID: CN026120765: "40 Gbit/s soliton transmission over standard fiber with dispersion management", *OSA Technical Digest Series,* vol. 5 (1998), pp. NWE10–1/89–NWE10–3/91.

D.S. Govan, W. Forysiak, and N.J. Doran, Inside Conference Item ID: CN030112236: "40 Gbit/s RZ transmission over more than 2000 km of standard fibre with dispersion management", Colloquium Digest—IEE (1999), Issue 22, pp. 3/1–3/6.

D.S. Govan, W. Forysiak, and N.J. Doran, INSPEC Abstract No.: A9901–4280S–011, B9901–6260C–006: "Long–distance 40 Gbit/s soliton transmission over standard fiber by use of dispersion management", *Optics Letters,* vol. 23, No. 19 (Oct. 1, 1998), pp. 1523–1525.

D.S. Govan, N.J. Smith, F.M. Knox, and N.J. Doran, INSPEC Abstract No.: A9802–4281–004, B9801–4125–040: "Stable propagation of solitons with increased energy through the combined action of dispersion management and periodic saturable absorption", *J. Opt. Soc. Am. B,* vol. 14, No. 11, (Nov. 1997), pp. 2960–2966.

D.S. Govan, S.K. Turitsyn, and N.J. Doran, INSPEC Abstract No.: B2001–01–6160F–054: "40–Gbit/s dispersion managed–soliton transmission over 3000 km of standard fiber through optimization of the dispersion map parameters", *CLEO 2000,* Cat. No. 00CH37088, pp. 238–239.

P. Harper, S.B. Alleston, I. Bennion, and N.J. Doran, INSPEC Abstract No.: B2000–02–6260F–003: "40 Gbit/s dispersion managed soliton transmission over 1160 km is standard fibre with 75 km span length", *Electronics Letters,* vol. 35, No. 24 (Nov. 25, 1999), pp. 2128–2130.

P. Harper, S.B. Alleston, and N.J. Doran, Inside Conference Item ID: CN037961966: "80 Gbit/s RZ Transmission over 523 km Using Dispersion Compensated Standard Fibre", 26th European Conference on Optical Communication (2000), vol. 2, pp. 143–146 VDE.

P. Harper, S.B. Alleston, W. Forysiak, and N.J. Doran, INSPEC Abstract No.: B2001–02–6260C–035: "10 Gbit/s dispersion–managed soliton transmission over 13,400 km in a weak symmetric non–zero dispersion shifted fiber dispersion map", CLEO 2000, *TOPS,* IEEE Cat. No. 00CH37088, vol. 39, pp. 237–238.

P. Harper, S.B. Alleston, D.S. Govan, W. Forysiak, I. Bennion, and N.J. Doran, Inside Conference Item ID: CN036435057: "40 Gbit/S Recirculating Loop Experiments on Dispersion Managed Standard Fibre", Massive WDM and TDM Soliton Transmission Systems (2000), vol. 6, pp. 387–402.

P. Harper, S.B. Alleston, I.S. Penketh, D.S. Govan, I. Bennion, A.D. Ellis, and N.J. Doran, INSPEC Abstract No.: B2000–07–6260F–012: "40 Gbit/s nonlinear RZ pulse propagation over 900 km with a 75 km standard fibre span using dispersion compensation: optimization of the launch position", *ECOC '99,* vol. 1 (Sep. 26–30, 1999), pp. I–232–I–233.

P. Harper, F.M. Knox, D.S. Govan, P.N. Kean, I. Bennion, A.D. Ellis, and N.J. Doran, INSPEC Abstract No.: B9806–6260–126: "Long distance 10 Gbit/s soliton transmission over standard fibre with periodic dispersion compensation", Core and ATM Networks NOC '97, pp. 18–24.

P. Harper, F.M. Knox, P.N. Kean, I. Bennion, and N.J. Doran, INSPEC Abstract No.: B9806–6260–126: "10 Gbit/s soliton propagation over 5250 km in standard fiber with dispersion compensation", *OFC '97 Technical Digest,* IEEE Cat. No. 97CH36049, vol. 6, pp. 304–305.

P. Harper, F.M. Knox, P.N. Kean, L. Zhang, N.J. Doran, and I. Bennion, INSPEC Abstract No.: A9612–4265S–016, B9607–4340–309: "Soliton transmission over 2700 km using an in–fibre Bragg grating filter to give Gordon–Haus jitter reduction", *IEE Colloquium on Optical Solitons: Principles and Applications (Digest No. 1996/090)* (1996), p. 8/1–4.

P. Harper, F.M. Knox, P.N. Kean, Z. Zhang, N.J. Doran, and I. Bennion, E.I. No.: EIP96110399059: "Jitter suppression in a 2700 km using soliton propagation using only a fibre Bragg grating filter", *Conference on Lasers and Electro–Optics Europe—Technical Digest,* CThF3 (1996), p. 425.

P. Harper, I.S. Penketh, S.B. Alleston, I. Bennion, and N.J. Doran, INSPEC Abstract No.: B9812–6260–152: "10 Gbit/s dispersion managed soliton propagation over 200 Mm without active control", *Electronics Letters,* vol. 34, No. 21 (Oct. 15, 1998), pp. 1997–1999.

P. Harper, I.S. Penketh, S.B. Alleston, and N.J. Doran, INSPEC Abstract No.: A1999–14–4280S–015, B1999–07–6260=011: "200 000 km 10 Gbit/s soliton propagation exploiting periodic saturable absorption", ECOC '98, (IEEE Cat. No. 98TH8398), vol. 1 (Sep. 1998), pp. 107–108.

P. Harper, I.S. Penketh, and N.J. Doran, INSPEC Abstract No.: A9820–4281–012, B9810–4125–043: "Dispersion optimized soliton propagation over 24 000 km in standard fibre using dispersion compensation", Long–Haul, ATM and Multi–Media Networks, IOS '98, pp. 244–252.

A. Hasegawa (Ed.), "Physics and Applications of Optical Solitons in Fibres '95", Table of Contents, Proceedings of the Symposium held in Kyoto, Japan, Nov. 14–17, 1995, Solid–State Science and Technology Library.

A. Hasegawa and Y. Kodama, Guiding–center soliton in fibers with periodically varying dispersion, *Optics Letters,* vol. 16, No. 18, (Sep. 15, 1991), pp. 1385–1387.

M.N. Islam, et al., "Soliton Intensity–Dependent Polarization Rotation", *Optics Letters,* vol. 15, No. 1 (Jan. 1, 1990).

S. Kawai, K. Iwatsuki, K. Suzuki, S. Nishi, M. Saruwatari, K. Sato, and K. Wakita, "10 Gbit/s optical soliton transmission over 7200 km bu using a monolithically integrated MQW–DFB–LD/MQW–EA modulator light source", *Electronic Letters,* vol. 30, No. 3 (Feb. 3, 1994), pp. 251–252.

S.M.J. Kelly, K. Smith, K.J. Blow, and N.J. Doran, INSPEC Abstract No.: A91141490, B91077790: "Average soliton dynamics of a high–gain erbium fiber laser", *Optics Letters,* vol. 16, No. 17 (Sep. 1, 1991), pp. 1337–1339.

F.M. Knox, P. Harper, P.N. Kean, I. Bennion, and N.J. Doran, Inside Conference Item ID CN014437473: "10 Gbit/s soliton transmission over standard fibre", *Colloquium Digest—IEEE,* Issue 90 (1996), pp. 13/1–4.

F.M. Knox, W. Forysiak, and N.J. Doran, INSPEC Abstract No.: A9524–4265S–003, B9512–4340–074: "10–Gbt/s soliton communication systems over standard fiber at 1.55 $\mu$m and the use of dispersion compensation", *Journal of Lightwave Technology,* vol. 13, No. 19 (Oct. 1995), pp. 1955–1962, Issn: 0733–8724.

F.M. Knox, W. Forysiak, and N.J. Doran, E.I. No. EP95012505817: "Upgrading standard fibre communication links to 10 Gbit/s using solitons and dispersion compensation", CLEO/Europe '94, IEEE Cat. No. 94TH0614–8, pp. 279–280.

F.M. Knox, P. Harper, P.N. Kean, and I. Bennion, and N.J. Doran, INSPEC Abstract No.: A9612–4265S–019, B9607–4340–042: "10 Gbit/s soliton transmission over standard fibre", IEEE Colloquium on Optical Solitons: Principles and Applications (Digest No. 1996/090) (1996), p. 13/1–4.

F.M. Knox, P. Harper, and P.N. Kean, I. Bennion, and N.J. Doran, INSPEC Abstract No.: A9720–4280S–005, B9710–6260–204: "Soliton transmission at 10 Gbit/s over 2022 km of standard fibre with dispersion compensation", 22nd European Conference on Optical Communication— ECOC '96, IEEE Cat. No. 96TH8217, vol. 3, pp. WeC.3.2/ 3.101–WeC.3..2/3.104.

F.M. Knox, P. Harper, P.N. Kean, N.J. Doran, and I. Bennion, INSPEC Abstract No. B9511–4125–030: "Low jitter long distance pulse transmission near net fibre dispersion zero wavelength", *Electronic Letters,* vol. 31, No. 17 (Aug. 17, 1995), pp. 1467–1468.

K. Kubota and M. Nakazawa, "A Dispersion–Allocated Soliton and Its Impact on Soliton Communication", Physics and Applications of Optical Solitons in Fibres '95: Proceedings of the Symposium held in Kyoto, Japan (Nov. 14–17, 1995), pp. 27–36.

H. Kubota and M. Nakazawa, "Partial soliton communication systems", *Optics Communications,* vol. 87, No. 1,2 (1992), pp. 15–18.

V.K. Mezentsev, S.K. Turitsyn, and N.J. Doran, INSPEC Abstract No.: B2001–01–6260–002: "System optimization of 80 Gbit/s single channel transmission over 1000 km of standard fibre", *Electronics Letters,* vol. 36, No. 23 (Nov. 9, 2000), pp. 1949–1951.

M. Nagazawa and H. Kubota, "Optical soliton communication in a positively and negatively dispersion–allocated optical fibre transmission line", *Electronic Letters,* vol. 31, No. 3 (Feb. 2, 1995), pp. 216–217.

B.P. Nelson, D. Cotter, K.J. Blow, and N.J. Doran, INSPEC Abstract No.: A83095161, "Large nonlinear pulse broadening in long lengths of monomode fibre", *IEEE* (1983), p. 7/1–3.

B.P. Nelson, D. Cotter, K.J. Blow, and N.J. Doran, INSPEC Abstract No.: A84024075: "Large nonlinear pulse broadening in long lengths of monomode fibre", *Optics Communications,* vol. 48, No. 4 (Dec. 15, 1983), pp. 292–294.

A.M. Niculae, W. Forysiak, and N.J. Doran, 02502966 Inside Conference Item ID: CN026121447: "Remarkable properties of dispersion managed solitons", *OSA Technical Digest Series* vol. 5 (1998), pp. 184/NThD3–1–186/ NThD3–3.

A.M. Niculae, W. Forysiak, and N.J. Doran, INSPEC Abstract No.: A1999–10–4280S–033, B1999–05–6260M– 072: "Optimal amplifier location in strong dispersion–managed soliton systems", IEE Colloquium Optical Solitons (Ref. No. 1999/016) (1999), pp. 8/1/4.

A.M. Niculae, W. Forysiak, A.J. Gloag, T.H.B. Nijhof, and N.J. Doran, INSPEC Abstract No.: B9812–6260–236: "Soliton collisions with wavelength–division multiplexed systems with strong dispersion management", *Optics Letters,* vol. 23, No. 17 (Sep. 1, 1998), pp. 1354–1356.

J.H.B. Nijhof, and N.J. Doran, Inside Conference Item ID: CN03634995: "Symmetry–Breaking and Bistability for Dispersion–Managed Solitons", *Massive WDM and TDM Soliton Transmission Systems,* Solid State Science and Technology Library (2000), vol. 6, pp. 299–308.

J.H.B. Nijhof, N.J. Doran, and W. Forysiak, INSPEC Abstract No.: A1999–14–4280S–014, B1999–07– 6260F–011: "Dispersion–managed solitons in the normal dispersion regime: a physical interpretation", *ECOC '98,* IEEE Cat. No. 98TH8398, vol. 1 (Sep. 20–24, 1998), pp. 103–104.

J.H.B. Nijhof, N.J. Doran, and W. Forysiak, INSPEC Abstract No.: A9820–4281–019, B9810–4125–058: "Energy enhancement of dispersion–managed solitons for strong dispersion maps", *OFC '98 Technical Digest,* IEEE Cat. No. 98CH36177, vol. 2, p. 268.

J.H.B. Nijhof, N.J. Doran, W. Forysiak, and A. Berntson, INSPEC Abstract No.: B9805–6260–088: "Energy enhancement of dispersion–managed solitons and WDM", *Electronics Letters,* vol. 34, No. 5 (Mar. 5, 1998), pp. 481–482.

J.H.B. Nijhof, N.J. Doran, W. Forysiak, and F.M. Knox, INSPEC Abstract No.: A9723–4281–012, B9712–6260–048: "Stable soliton–like propagation in dispersion managed systems with net anomalous, zero and normal dispersion", Electronics Letters, vol. 33, No. 20 (Sep. 25, 1997), pp. 1726–1727.

J.H.B. Nijhof, W. Forysiak, and N.J. Doran, INSPEC Abstract No.: A1999–03–4280S–022, B1999–02–6260V–029: "Dispersion–managed solitons in the normal dispersion regime: a physical interpretation", Optics Letters, vol. 23, No. 21 (Nov. 1, 1998), pp. 1674–1676.

J.H.B. Nijhof, W. Forysiak, and N.J. Doran, INSPEC Abstract No.: A2000–16–4265S–009, B2000–08–4340S–007: "The averaging method for finding exactly periodic dispersion–managed solitons", IEEE Journal of Selected Topics in Quantum Electronics, vol. 6, No. 2 (Mar./Apr. 2000), pp. 330–336.

C. Parée, A. Villeneuve, P.–A. Bélanger, and N.J. Doran, INSPEC Abstract No.: A9611–4265J–004, B9606–4340–090: "Compensating for dispersion and the nonlinear Kerr effect without phase conjugation", Optics Letters, vol. 21, No. 7 (Apr. 1, 1996), pp. 459–461.

C. ParéA. Villeneuve, P.–A. Beélanger, N. Bélanger, and N.J. Doran, INSPEC Abstract No.: A9709–4280S–018, B9705–6260–040, "Dispersion and self–phase modulation compensation based on a negative nonlinearity", Technical Digest Series, vol. 6 (1996), pp. 598/IthA7–1–601/IthA7–4.

I.S. Penketh, P. Harper, S. B. Alleston, A.M. Niculae, I. Bennion, and N.J. Doran, INSPEC Abstract No.: A1999–17–4280S–034, B1999–09–6260–009: "10–Gbit/dispersion–managed soliton transmission over 16,500 km in standard fiber by reduction of soliton interactions", Optics Letters, vol. 24, No. 12 (Jun. 15, 1999), pp. 802–804.

L.J. Richardson, W. Forysiak,, and N.J. Doran, Inside Conference Item ID: CN037962909: "320 Gbit/s Single Channel Transmission 4,500 Km Using Short Period Dispersion Management", 26th European Conference on Optical Communication (2000), vol. 3, pp. 187–188 VDE.

L.J. Richardson, W. Forysiak, and N.J. Doran, INSPEC Abstract No.: A1001–01–4265S–023, B2001–01–4340S–016: "Energy enhancement of short–period dispersion–managed solitons", CLEO 2000, TOPS, IEEE Cat. No. 00CH37088, vol. 39, pp. 32–33.

L.J. Richardson, W. Forysiak, and N.J. Doran, INSPEC Abstract No.: A2000–19–4265S–004, B2000–10–4340S–003: "Dispersion–managed soliton propagation in short–period dispersion maps", Optics Letters, vol. 25, No. 14 (Jul. 15, 2000), pp. 1010–1012.

L.J. Richardson, W. Forysiak, and N.J. Doran, INSPEC Abstract No.: B2001–05–6260–011: "The Trans–oceanic 160–Gb/s single–channel transmission using short–period dispersion management", IEEE Photonics Technology Letters, vol. 13, No. 3 (Mar. 2001), pp. 209–211.

L.J. Richardson, W. Forysiak, N.J. Doran, and K.J. Blow, INSPEC Abstract No. B2001–07–6260–016: "Long–haul ultra high–speed transmission using dispersion managed solitons", IEICE Trans. Electronic., vol. E84–C, No. 5 (May 2001), pp. 533–540.

L.J. Richardson W. Forysiak, N.J. Doran, K.J. Blow, INSPEC Abstract No.: B2001–08–6260C–032: "Long–haul ultra high–speed transmission using dispersion managed solitons", IEICE Trans. Commun., vol. E84–B, No. 5 (May 2001), pp. 1159–1166.

L.J. Richardson, W. Forysiak, N.J. Doran, and K.J. Blow, JICST Accession No.: 01A0565348 File Segment: JICST–E, "Long–Haul Ultra High–Speed Transmission Using Dispersion Managed Solitons", IEICE Trans Electron (May 2001), vol. E84–C, No. 5, Fig. 19, Ref. 50, pp. 533–540.

N.J. Smith and N.J. Doran, INSPEC Abstract No.: A9612–4281–009, B9607–4125–008: "Modulational instabilities in fibers with periodic dispersion management", Optic Letters, vol. 21, No. 8 (Apr. 15, 1996), pp. 570–572.

N.J. Smith and N.J. Doran, INSPEC Abstract No.: B9510–6260–179: "Gordon–Haus jitter suppression using a single phase modulator in long span soliton systems", ECOC '95, 20th European Conference on Optical Communication, vol. 1 (1994), pp. 241–244.

N.J. Smith, N.J. Doran, and W. Forysiak, INSPEC Abstract No.: A9609–4280S–013, B9605–6260–075: "Gordon–Haus jitter suppression using an ultra–span phase modulator and post transmission dispersion compensator", IEEE Photonics Technology Letters, vol. 8, No. 3 (Mar. 1996), pp. 455–457.

N.J. Smith, N.J. Doran, W. Forysiak, and F.M. Knox, INSPEC Abstract No.: A9723–4281–005, B9712–4125–007: "Soliton transmission using periodic dispersion compensation", Journal of Lightwave Technology, vol. 15, No. 10 (Oct. 1997), pp. 1808–1822.

N.J. Smith, N.J. Doran, F.M. Knox, and W. Forysiak, INSPEC Abstract No.: A9707–4265S–010, B9704–4340–042: "Energy–scaling characteristics of solitons in strongly dispersion–managed fibers", Optics Letters, vol. 21, No. 24 (Dec. 15, 1996), pp. 1981–1983.

N.J. Smith, W. Forysiak, and N.J. Doran, INSPEC Abstract No.: B9701–6260–010: "Reduced Gordon–Haus jitter due to enhanced power solitons in strongly managed systems", Electronics Letters, vol. 32, No. 22 (Oct. 24, 1996), pp. 2085–2086.

N.J. Smith, W. Forysiak, and N.J. Doran, INSPECT Abstract No.: B9808–6260–182: "Gordon–Haus jitter reduction in enhanced power soliton systems", OFC '97 Technical Digest, IEEE Cat. No. 97CH36049, vol. 6, p. 309.

N.J. Smith, F.M. Knox, N.J. Doran, K.J. Blow, and I. Bennion, INSPEC Abstract No.: B9603–6260–093: "Enhanced power solitons in optical fibres with periodic dispersion management", Electronics Letters, vol. 32, No. 1 (Jan. 4, 1996), pp. 54–55.

N.J. Smith, F.M. Knox, N.J. Doran, K.J. Blow, and I. Bennion, INSPEC Abstract No.: A9612–424265S–014, B9607–4340–037: "Dispersion management of optical fiber solitons", IEE Colloquium on Optical Solitons: Principles and Applications (Digest No. 1996/090) (1996), p. 6/1–5.

M. Suzuki, N. Edagawa, I. Morita, S. Yamamoto, H. Taga, and S. Akira, "Multi–Ten Gbit/s Soliton Transmission Over Transoceanic Distances", Physics and Applications of Optical Solitons in Fibres '95: Proceedings of the Symposium held in Kyoto, Japan (Nov. 14–17, 1995), pp. 375–391.

M. Suzuki, I. Morita, N. Edagawa, S. Yamamoto, H. Taga, and S. Akiba, "Reduction of Gordon–Haus timing jitter by periodic dispersion compensation in soliton transmission", Electronics Letters, vol. 31, No. 23 (Nov. 9, 1995), pp. 2027–2029.

M. Suzuki, I. Morita, S. Yamamoto, N. Edagawa, H. Taga, and S. Akiba: "Timing jitter reduction by periodic dispersion compensation in soliton transmission", Optical Fibre Communications (OFC'95), Opt. Soc. Am., Washington, D.C. (1995), Paper PD20–1/401–PD20–1/401–PD20–4/404.

S.K. Turitsyn, N.J. Doran, J.H.B. Nijhof, V.K. Mezentsev, T. Schäfer, and W. Forysiak, Inside Conference Item ID: CN037481040: "Dispersion–Managed Solitons", Centre de Physique—Publications (1999), Springer, No. 12, pp. 91–115.

S.K. Turitsyn, N.J.Doran, E.G. Turitsyna, E.G. Shapiro, and M.P. Fedoruk, INSPEC Abstract No.: A2001–01–4265S–022, B2001–01–434OS–015: "Soliton interaction in optical communication systems with short–scale dispersion management", CLEO 2000, *TOPS,* IEEE Cat. No. 00CH37088, vol. 39, (2000), pp. 30–31.

S.K. Turitsyn, N.J. Doran, E.G. Turistyna, E.G. Shapiro, M.P. Fedoruk, and S.B. Medvedev, Inside Conference Item ID: CN036434946: "Optical communications Systems with Schort–Scale Dispersion Management", Solid State Science and Technology Library (2000), vol. 6, pp. 235–251.

S.K. Turitsyn, M.P. Fedoruk, N.J. Doran, and W. Forysiak, INSPEC Abstract No.: B2000–08–6260F–006: "Optical Soliton transmission in fiber lines with short–scale dispersion management", *ECOC '99,* vol. 1 (Sep. 26–30, 1999), pp. 382–383.

S.K. Turitsyn, M.P. Fedoruk, W. Forysiak, and N.J. Doran, INSPEC Abstract No.: A2000–02–4280S–029, B2000–01–6260C–071: "Dispersion–management in fiber communication lines using Ramam amplification", *Optics Communications,* vol. 170, Nos. 1–3 (Oct. 15, 1999), pp. 23–27.

S.K. Turitsyn, J.H.B. Nijhof, V.K. Mezentsev, and N.J. Doran, INSPEC Abstract No.: A2000–04–4281–014, B2000–02–4125–089: "Symmetries, chirp–free points, and bistability in dispersion–managed fiber lines", *Optics Letters,* vol. 24, No. 24 (Dec. 15, 1999), pp. 1871–1873.

A.M. Niculae, W. Forysiak, and N.J. Doran, INSPEC Abstract No.: A2000–06–4265S–019, B2000–03–4340S–030: "Optical Amplifier location in strong dispersion–managed soliton systems", Conference on Lasers and Electro–Optics CLEO '99) (IEEE Cat. No. 99CH37013) (1999), pp. 236–237.

* cited by examiner

OPTICAL FIBRE COMMUNICATION SYSTEM

This invention relates to optical fibre communication systems and, in particular to communication systems which employ solitons or soliton-like pulses for data transmission. It is also applicable to systems in which the launch pulse may be phase modulated return-to-zero (RTZ). In such systems, which are not obviously soliton-like, after travelling a distance, the pulses are transformed into soliton-like pulses.

It has recently been shown that a new class of optical solitons occur in dispersion managed systems where alternating sections of negative (anomalous) and positive (normal) dispersion fibre are used. (See, for example, Suzuki, M., Morita, I., Edagawa, N., Yamamoto, S., Taga, H., and Akiba, S., 'Reduction of Gordon-Haus timing jitter by periodic dispersion compensation in soliton transmission', Electron. Lett., 1995, 31, (23), pp. 2027–2029, Smith, N. J., Knox, F. M., Doran, N. J., Blow, K. J., and Bennion, I., 'Enhanced power solitons in optical fibres with periodic dispersion management', Electron. Lett., 1996, 32, (1), pp54–55 and Smith, N. J., Forysiak, W., and Doran, N. J., 'Reduced Gordon-Haus jitter due to enhanced power solitons in strongly dispersion managed systems', Electron. Lett., 1996, 32, (22), pp2085–2086.

In a further paper entitled 'Energy scaling characteristics of solitons in strongly dispersion-managed fibres', Opt. Lett., 1996. 21, (24), pp1981–1983, Smith et al. derived an empirical relationship for the enhanced power of these solitons, where the average dispersion is anomalous and significantly less (in magnitude) than the dispersion in the two segments. These lossless calculations showed the importance of the launch point in the map (the minimum chirp is at the centre of either section), but did not establish the exact pulse shape, nor the long term stability of the pulses.

We have discovered that by using dispersion management, in which an optical communication system uses alternative sections of fibre of opposite sign of dispersion, that transmitted pulses are not distorted (neither dispersively nor effectively nonlinearly) provided the correct form of the pulse is selected. It is possible to have stable pulses (solitons) where the net dispersion is zero, normal or anomalous. There are no solitons for normal dispersion, but pulses are also stable in this regime. This permits wavelength multiplexing around the zero dispersion since, although the dispersion depends on wavelength, it is unavoidable that both signs will occur. However, the new arrangement permits solitons to be used for a wide range of wavelengths.

We have found that the shape of pulse is significant. For these systems it is important to pre-chirp the pulse in an appropriate way. The degree of chirp and pulse duration depends on the data rate required and how the map is designed.

We have also discovered that for zero net dispersion there appears a preferred pulse duration for a particular map. The ratio $$\frac{\beta l}{\tau^2} \sim 4,$$

where $\beta$ is the fibre dispersion, $\tau$ is the pulse duration and $l$ is the fibre length. It means that the system (for the zero dispersion case) is specified by the pulse duration (effectively the data rate) and the dispersion of the fibres i.e. the length of each section can be immediately inferred. For example if $\tau$=20 ps (10 OGb/s) and $\beta$~20 ps$^2$/km (standard fibre), then the fibre lengths should be 80 km. Alternatively, if $\beta$=1 ps$^2$/km (dispersion shifted fibre typical number) then 1600 km is ideal. Numerical modelling indicates that there are stable nonlinear transmission pulses for periodically dispersion managed systems where the path average dispersion may be either anomalous, zero, or even normal.

A new class of stable pulses is demonstrated to exist when the average dispersion is zero or even normal. The discovery of these stable pulses allows the use of solitons in WDM systems around the zero (average) dispersion, where due to dispersion slope effects both signs of dispersion are inevitable.

According to one aspect of the present invention there is provided a soliton or soliton-like pulse-based optical communication system comprising a length of optical fibre divided into a plurality of sections wherein the average dispersion of the length of fibre is significantly different from the dispersion of each section. According to a further aspect of the present invention there is provided a soliton or soliton-like pulse-based optical communication system comprising a length of optical fibre divided into a plurality of sections wherein the average dispersion of the length of fibre is significantly different from the dispersion of each section and wherein the pulse duration t is substantially equal to ¼$\beta l$ where $\beta$ is the fibre dispersion, $\tau$ is the pulse duration and l is the fibre length.

The invention will be particularly described by way of example, with reference to the accompanying drawings, in which FIG. 1 shows propagation for 100 000 km for a pulse with E=0.03 pJ, and 100 km sections of $\beta''$=−5.1 ps$^2$/km and fl"=4.9 ps$^2$/km. The pulse is shown at the mid point of the anomalous section FIG. 2 shows propagation over one cycle for a pulse with E=0.03 pJ, and 100 km sections of $\beta$=−5.1 ps$^2$/km and $\beta''$=4.9 ps$^2$/km FIG. 3 shows stable propagation for 80 000 km at net zero dispersion for a pulse with E=0.2 pJ, and 80 km segments of $\beta''$=±10 ps$^2$/km. The pulse is shown at the mid point of the anomalous section, FIG. 4 shows the pulse width versus energy for a dispersion map with zero average dispersion. (a) at the segment boundary, (b) in the mid point of the normal segment, (c) in the mid point of the anomalous segment;

We have performed extensive numerical investigations on a two stage map for individual pulses, ignoring loss in the first instance. Our procedure is first to accurately establish the long distance stable solution if it exists. In general, if one starts with some reasonable initial pulse shape and size, then the pulse width, taken at a fixed point in each cycle, will oscillate over many cycles, as some radiation is shed and the long term stable pulse emerges. We use this effect by averaging the pulse shapes at the extreme of these oscillations to rapidly find the converged wave form with high accuracy. We can then remove the averaging to check the stability of the converged pulses.

Figure 1:
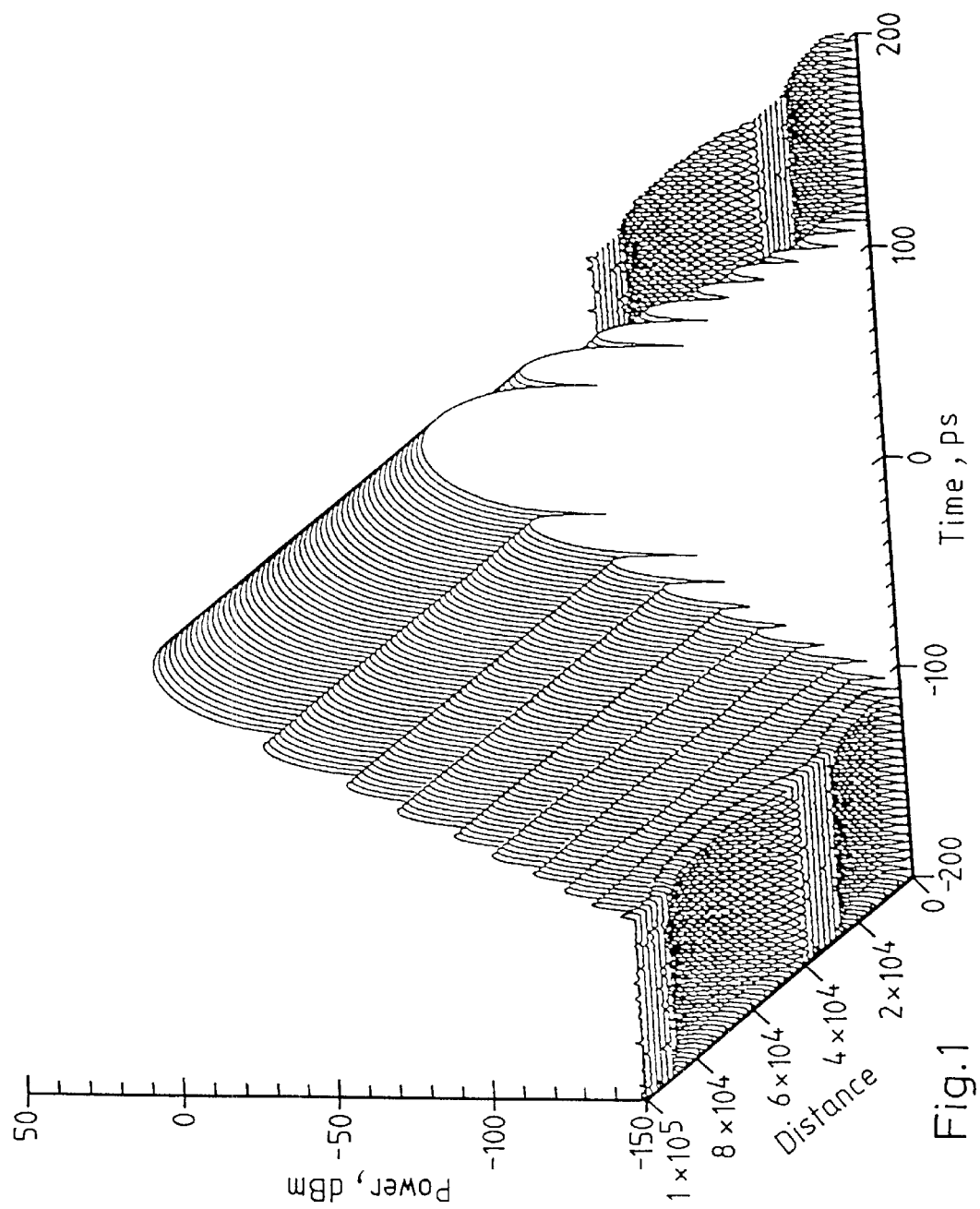
Figure 2:
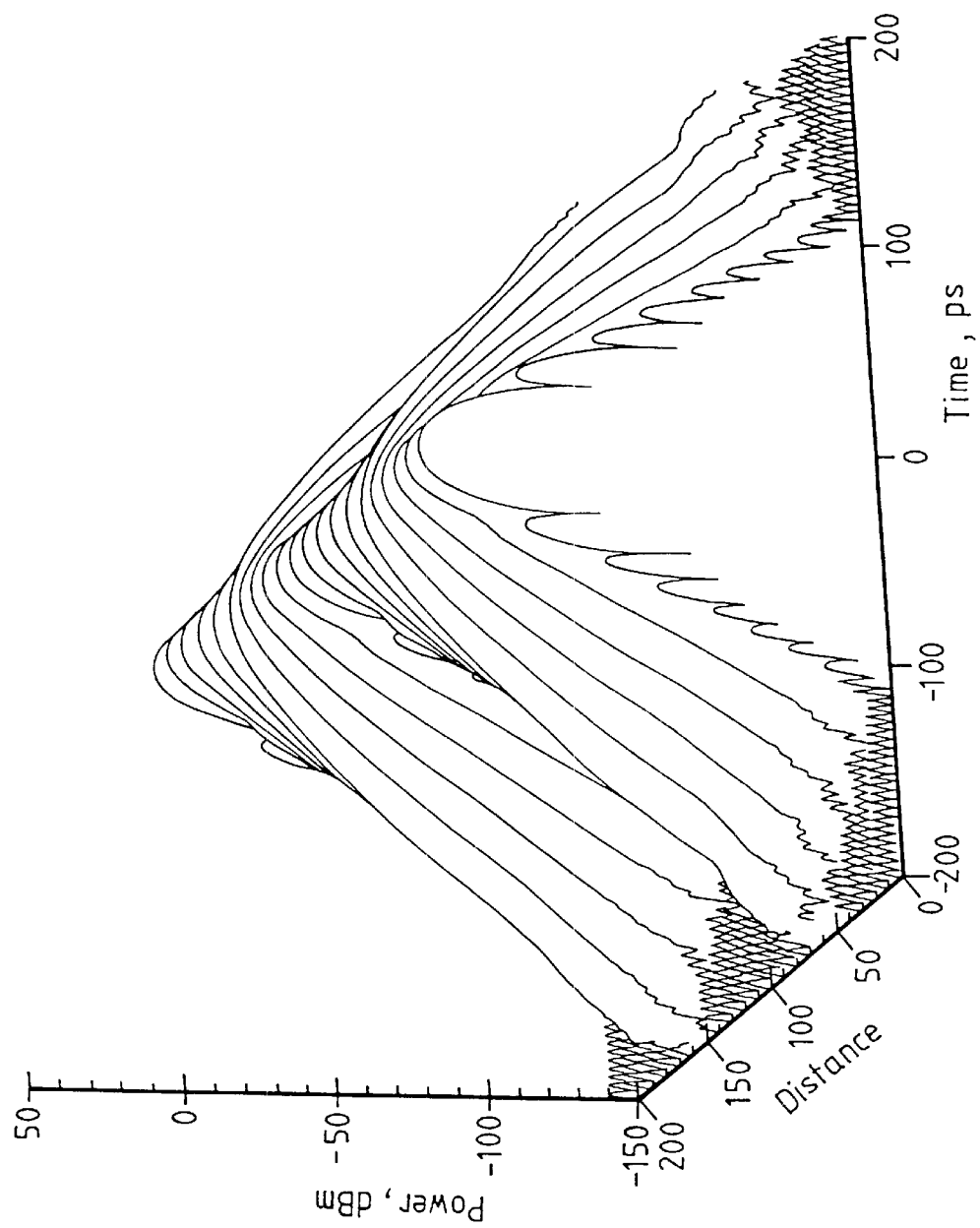

Using this technique we have discovered that long term stable pulses can indeed be obtained, provided that the average dispersion is significantly different from the dispersion in each section. FIG. 1 shows an example of such a pulse for a deep map with net anomalous dispersion and a power enhancement factor of 4.5. The evolution shows no evidence of radiation and is shown on a log scale to illustrate the extreme stability observed. FIG. 2 shows the evolution during one period of the map. At the mid point of each section, the pulse has a curved (Gaussian) centre and linear (exponential) wings with dips. At these points the pulse is totally unchirped, i.e. exactly in phase, and the dips are zeroes, roughly periodic in $t^2$. At the boundary between sections, where the pulse is widest, it becomes more sech-like (exponential) and is strongly chirped. These observations are typical for strong dispersion maps. Contrary to normal assumptions, the pulse is not self-similar during one cycle, i.e. the power spectrum also evolves.

Figure 3:
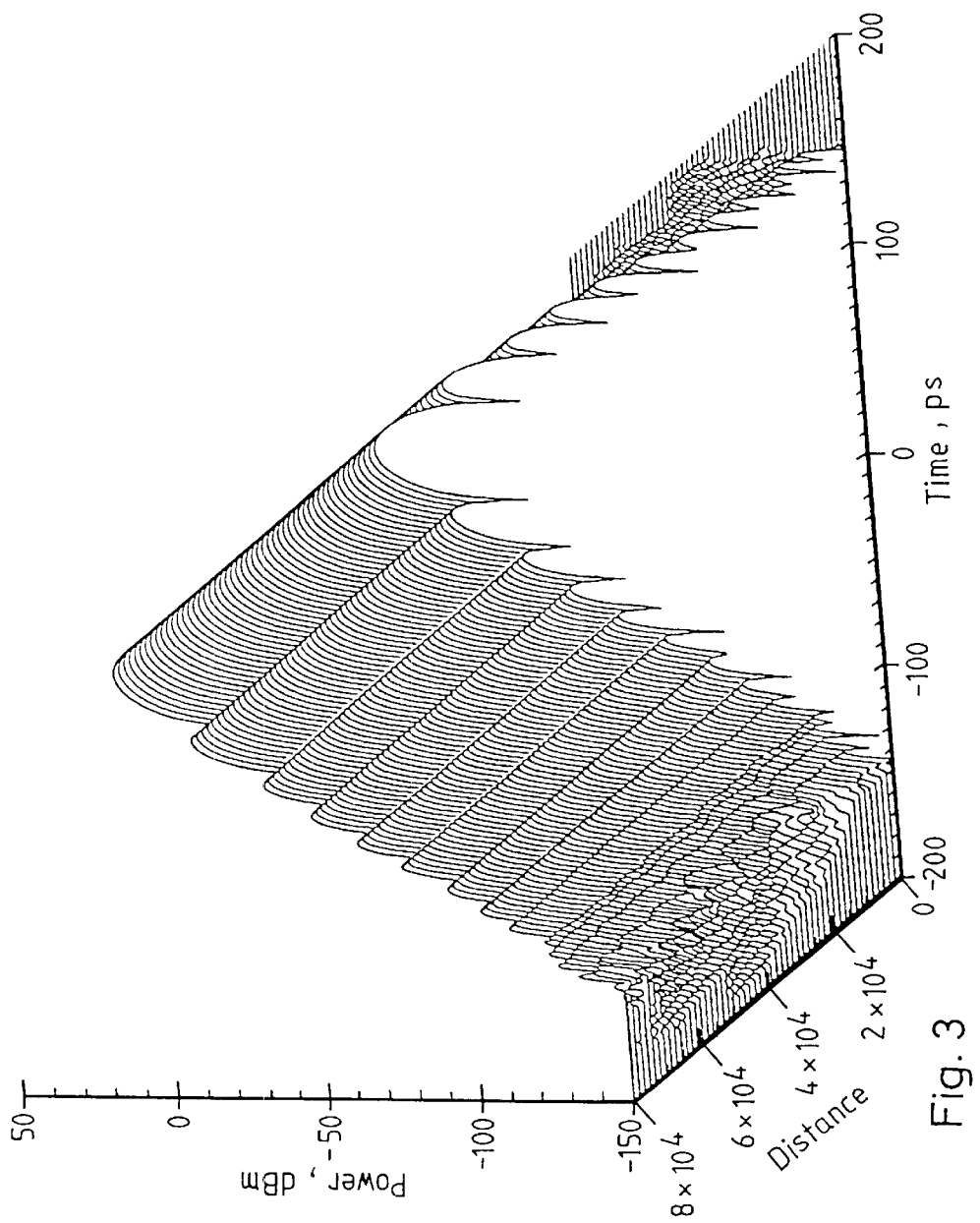

The most surprising result of our investigation is that such stable pulses exist not only for many different types of map with average anomalous dispersion, but also for maps with exactly balancing sections, i.e. zero average dispersion, and even where the average dispersion is normal. In each case the pulse is similar to the one illustrated in FIGS. 1 and 2. For instance, FIG. 3 shows a stable pulse for one case where there is no net dispersion. This is a remarkable result, since this pulse is certainly nonlinear. and there is no net dispersion against which to balance the nonlinearity in a conventional sense, yet the pulse does not show any spectral broadening. In this case it is clearly inappropriate to discuss a power enhancement, but for the parameters of FIG. 3 the pulse energy is equivalent to that of a conventional soliton with the same width for a constant dispersion of −2.5 ps$^2$/km. This is clearly a significant energy and will allow stable soliton-like operation at zero dispersion. Indeed we have found that, in contrast to what is seen in systems without dispersion control, including third order dispersion of 0.07 ps/km does not lead to a break-up of the pulse.

In the case of net normal dispersion, we have the equally surprising result that dispersion management allows exact nonlinear suppression of dispersion for these bright soliton-like pulses. We have obtained stable pulses for small values of the net normal dispersion, e.g. 80 km segments with a dispersion of−10 ps$^2$/km and +10.8 ps$^2$/km respectively. This of course is not possible with conventional bright solitons for uniform normal dispersion.

Figure 4:
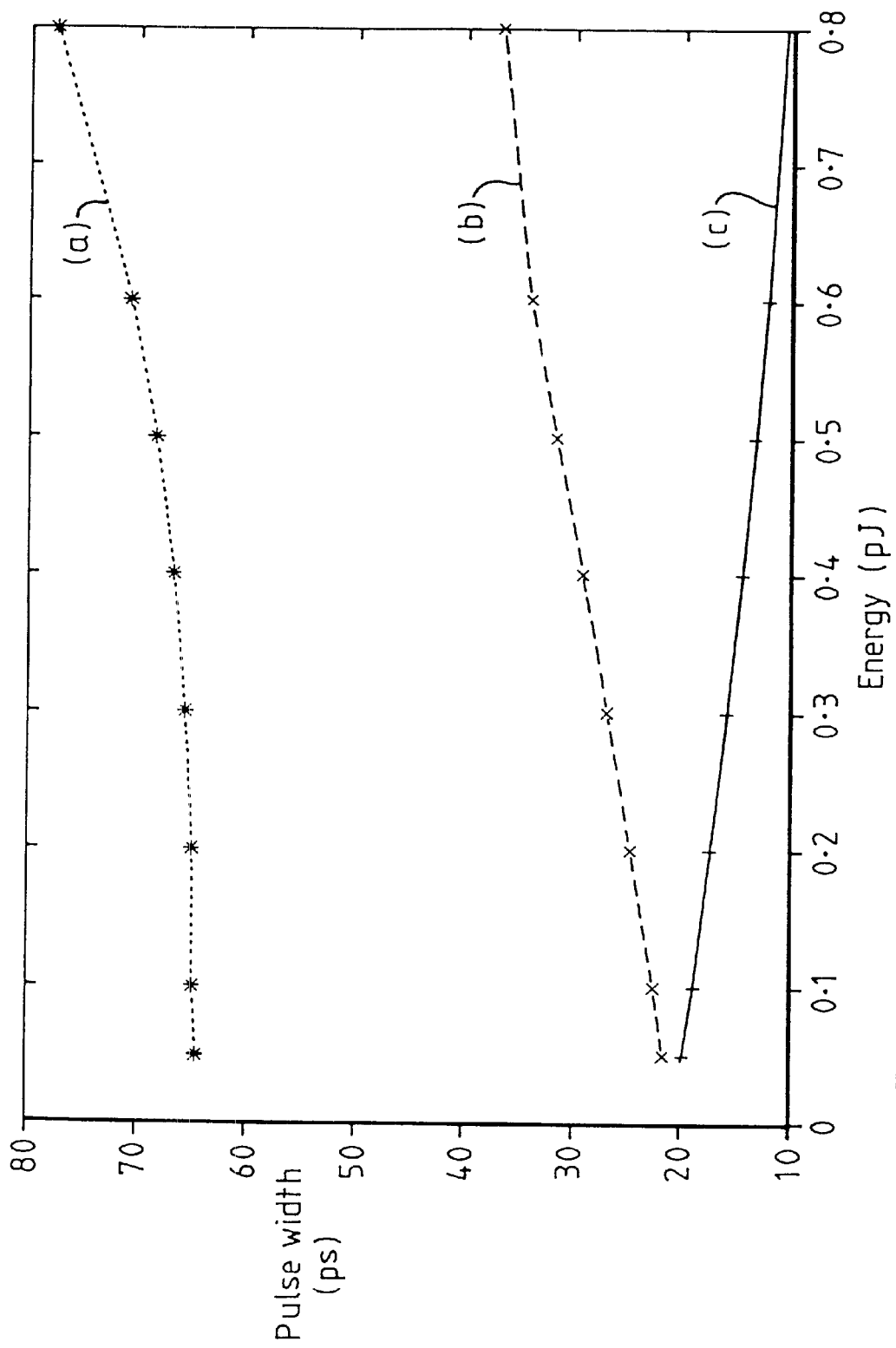

We have also investigated the dependence of the pulse width on the energy. For illustration, we consider the case of zero average dispersion, where there is effectively only one independent parameter after appropriate scaling. FIG. 4 shows the energy dependence of the pulse width for a particular map ($l_{1,2}$=80 km and, $\beta_{1,2}$=±10 ps$^2$/km). There is a nearly linear dependence on energy of the pulse width, increasing in the normal fibre and decreasing in the anomalous fibre, in contrast to conventional solitons, where the energy is inversely proportional to the pulse width, so that the pulse width goes to infinity as the energy goes to zero. Here we have observed that for a particular map there appears to be a 'preferred' optimal pulse width for small pulse energies.

We have also performed extensive studies of our new stable pulse and discovered that the energy enhancement depends on the average dispersion and the depth of the map in a complex manner.

The remarkable stability and the possibility of ultra-stable soliton-like propagation for dispersion of either sign (or zero) clearly implies that high data rate long distance soliton communication should be possible around the net zero dispersion. By operating at very low average dispersion, timing jitter effects can be virtually eliminated for a range of wavelengths, thus allowing WDM without the need for sliding filters nor active control.

Stable dispersion managed soliton-like pulses exist for anomalous and zero, as well as for normal, average dispersion. The region of observation is extensive in the net anomalous dispersion and therefore these pulses are suitable for long distance and WDM systems. Appropriately tailored initial pulses can be obtained from our numerical procedure, to achieve optimal performance. The correct pulse shape depends on the position in the cycle and thus on the launch point.

The region of allowed dispersion is considerably extended if the anomalous element is longer (or more nonlinear) than the normal fibre(element). Thus gratings for dispersion compensation will allow larger net normal dispersion for the same map strength. Thus there is a wider wavelength range for the asymmetric map with the anomalous section the longer one. (The reverse is true if the asymmetry is the other way around).

Dispersion managed solitons are excellent media for high-speed optical communication. Compared to standard solitons, their power is enhanced, they can propagate at zero and normal average dispersion, leading to reduced Gordon-Haus jitter, reduced pulse interaction and increased noise margins. We have found that by using asymmetric maps the soliton power can be further enhanced and the accessible bandwidth in the normal average dispersion regime can be increased. For systems using wavelength- division- multiplexing (WDM), asymmetric maps can equalise the soliton power in adjacent channels. The critical map strength, however, is unaffected by the map asymmetry, and the optimal strength for dispersion managed soliton systems is of the order 4.

In a two-stage map, where the dispersion alternates between normal and anomalous the pulse evolution is modelled by the nonlinear Schrödinger (NLS) equation $$iu_z = \frac{\beta''}{2}u_{tt} + \gamma|u|^2 u$$

where z is the distance of propagation, t is the local time, $\beta''$ and y are the dispersion and the nonlinear coefficient of the fibre, respectively. The pulse evolution in lossy fibres can also be modelled by this equation as long as the amplification period is different from the period of dispersion management. The stationary solutions in a two-stage map are characterised by three parameters, the map strength, S=$|\beta''_1-\beta''_2 L_2|/\tau^2$ FWHM (subscript 1 and 2 refer to the normal and the and the anomalous dispersion fibre, respectively, $L_n$ are the fibre lengths and $\tau_{FWHM}$ is the full width at half maximum at the mid-point of the anomalous fibre), the normalised average dispersion, $\beta''=\beta''_{ave}/\beta''^2$ ($\beta''$ is the average dispersion) and the map asymmetry $\delta=(\gamma_1/\beta''_1)/(\gamma_2/\beta''_2)$. The map strength is the normalised length of the dispersion map, $\beta''$ is the average dispersion in fractions of the local dispersion of the anomalous fibre, the map asymmetry indicates how equal the fibres are with respect to nonlinear effects. For two fibres with equal nonlinear coefficients ($\gamma_1=\gamma_2$), $\delta$ is the ratio of the dispersions and around zero average dispersion this is just the ratio of the lengths, $\delta=L_1/L_2$.

Figure 5A:
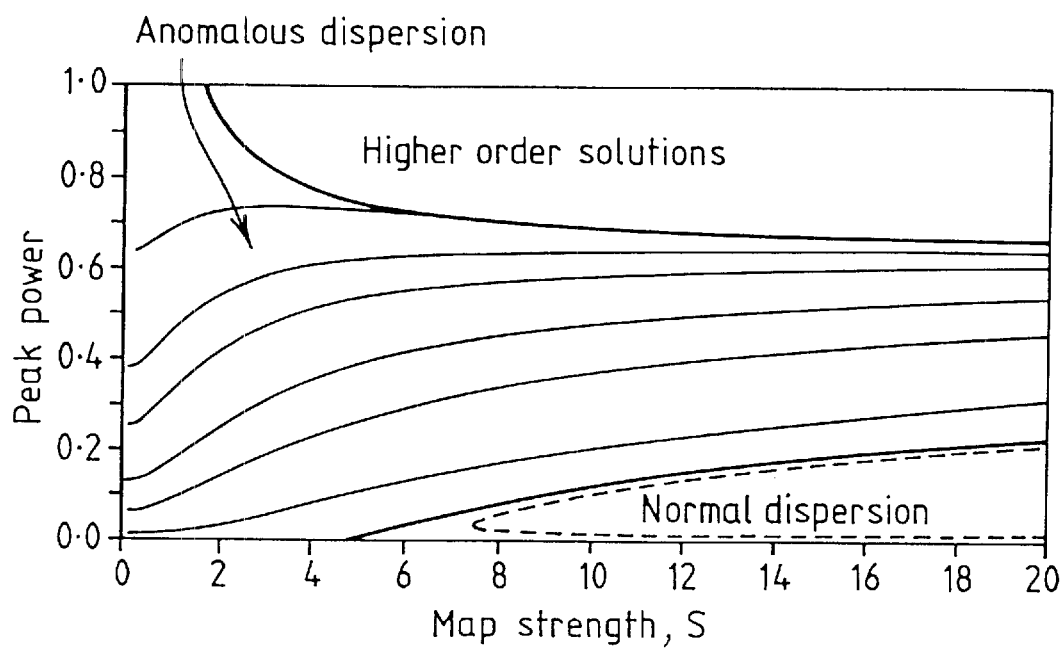
FIGS. 5 to 7 are dispersion maps illustrative of the invention.
Figure 5B:
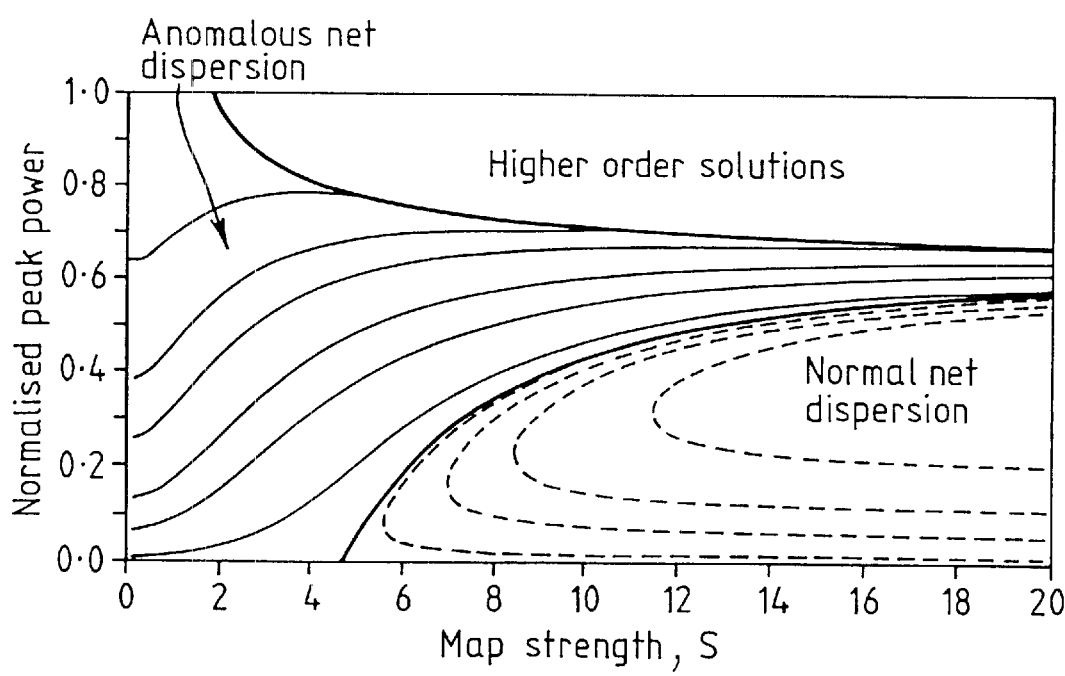
Figure 5C:
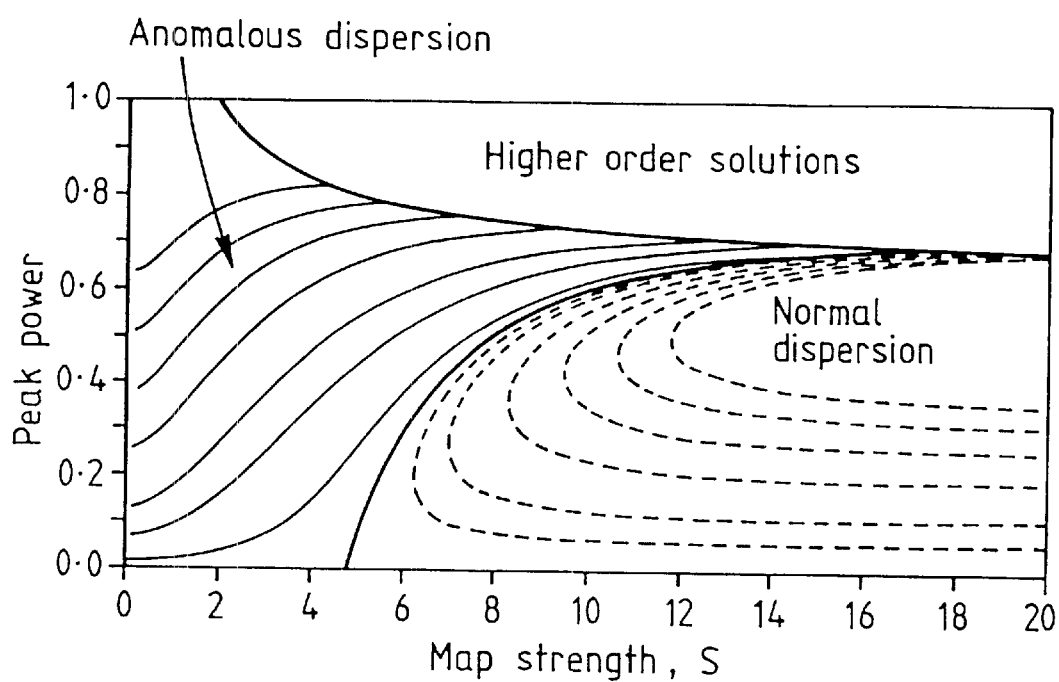
Figure 6A:
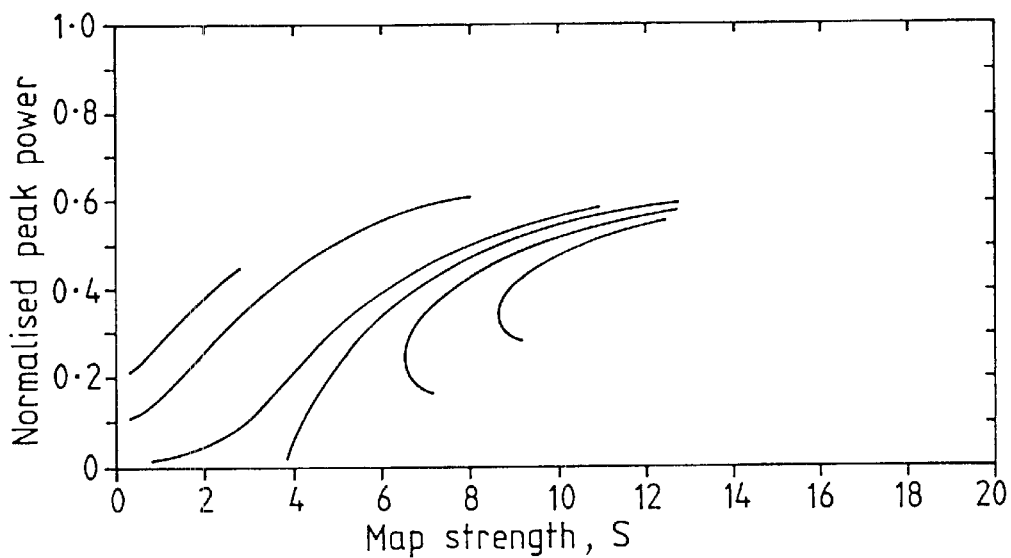
Figure 6B:
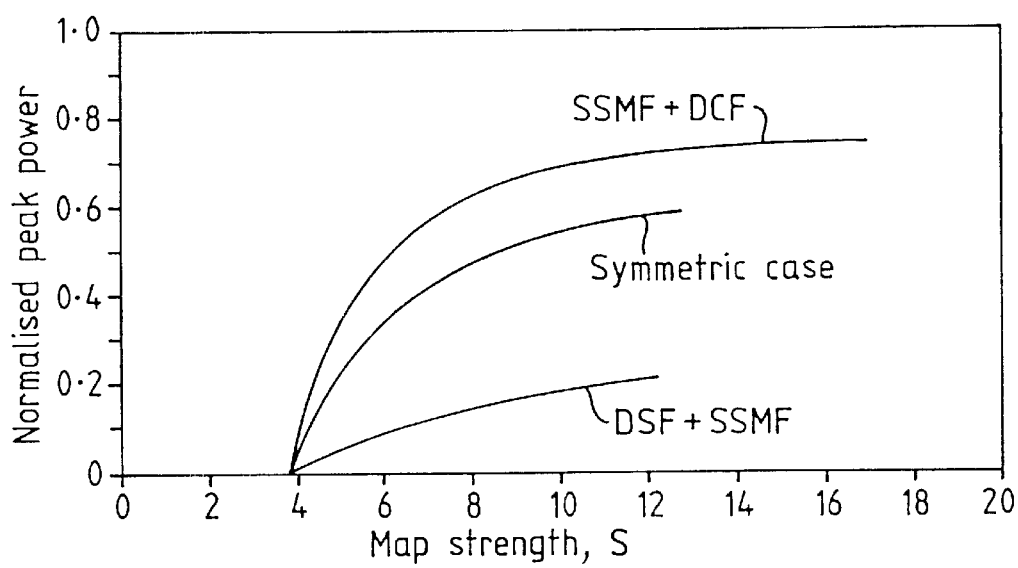

By using the variational approach of A. Berntson, N. J. Doran, W. Forysiak and J. H. B. Nijhof, Opt. Lett. and D. Anderson, Phys. Rev. A 27, 3135 (1983), we can calculate approximately the normalised power, $N^2=\gamma_2 P_0 \tau^2_{FWHM}/|\beta''_2|$ of the dispersion managed soliton as function of map strength S, normalised average dispersion and map asymmetry $\delta$, without further assumptions. The physical significance of $N^2$ is that it represents the power in fractions of the fundamental soliton power at the mid-point of the anomalous dispersion fibre. The result of this calculation is shown in FIG. 5 for three cases with different asymmetry. FIG. 5a (δ =10) shows the case of dispersion-shifted fibre (DSF) compensated by standard fibre (SSMF), FIG. 5b (δ=1) illustrates the symmetric case (equal magnitude of the dispersion), and FIG. 5c (δ=0.1) shows the case of SSMF upgraded by dispersion compensation fibre (DCF). The figures are contour plots, each line corresponding to fixed normalised average dispersion in the map strength/power plane. The variational predictions of FIG. 5 were qualitatively verified by numerical simulations presented in FIG. 6.

The basic structure of the maps of FIGS. 5a–c is the same. In each, there is a critical strength, S, =4.8 (numerically S. =3.9, see FIG. 6b), for propagation at zero and normal average dispersion. The critical strength is independent of the map asymmetry. The lower energy branch in the normal dispersion region is unstable and cannot be found numerically, see FIG. 6a. The changes in FIG. 5 as the map asymmetry is decreased, is that the dispersion is shifted towards more anomalous (or less normal) on the average, i.e. the region for normal average dispersion grows when going from FIG. 5a to FIG. c. This can be explained by noting that in the normal dispersion fibre nonlinear and dispersive effects cause a frequency chirp of the same sign. Nonlinear chirping can then replace dispersive chirping and the normal fibre can be shortened as it becomes more nonlinear.

Figure 7A:
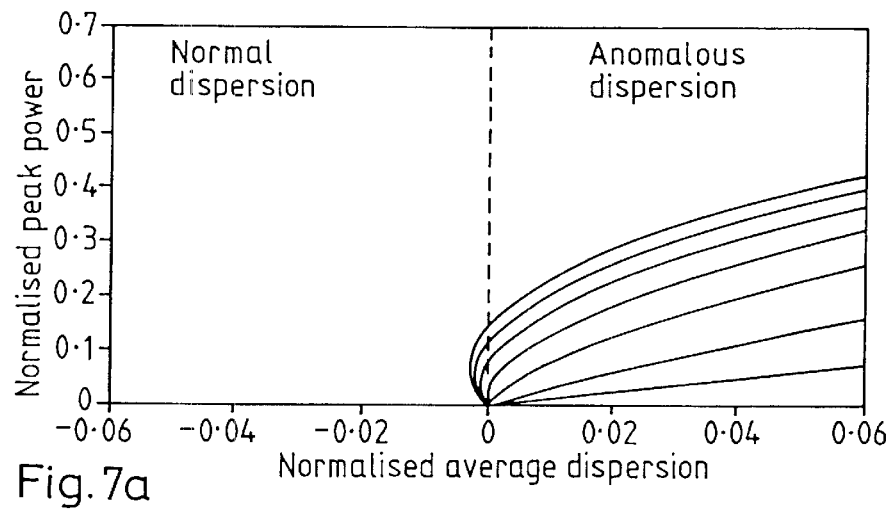
Figure 7B:
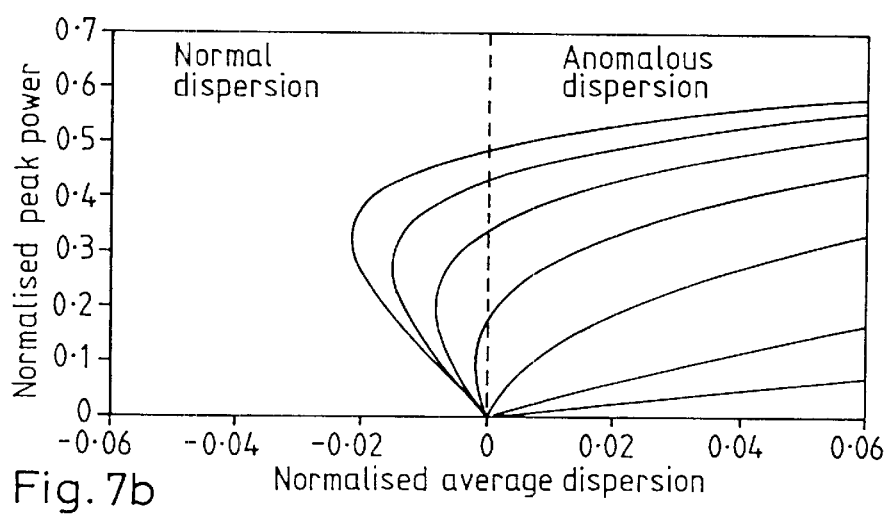
Figure 7C:
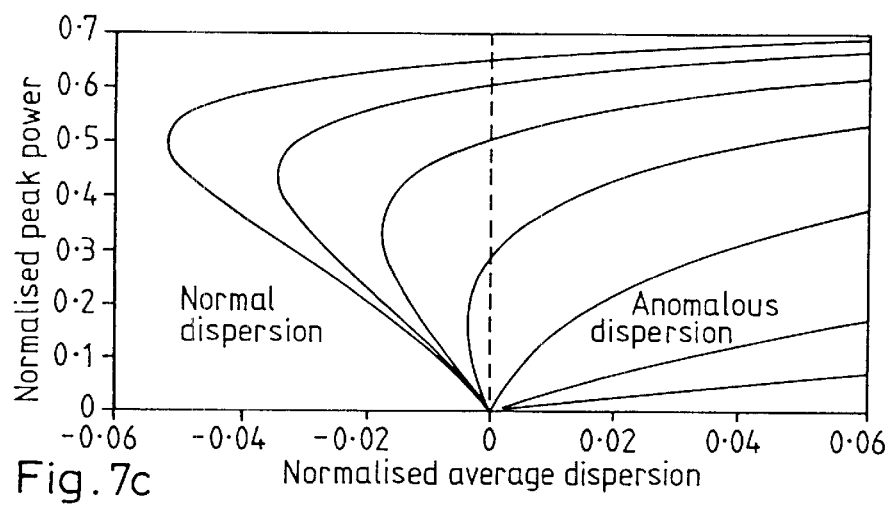

Comparing the soliton parameters for the cases shown in FIG. 5, the highest power, for a given average dispersion, is achieved for SSMF compensated by DCF (FIG. 5c). This case also gives the largest bandwidth in the normal average dispersion region, see FIG. 7. FIG. 7 shows the same data as in FIG. 5 but presented differently. The lines for constant map strength penetrate deeper into the normal dispersion regime for low δ) and this corresponds, via the dispersion slope, to a larger bandwidth. This means that the chances for experimental observation of dispersion-managed solitons in normal average dispersion will be better for low δ (SSMF+DCF). The accessible bandwidth is in this case approximately ten times larger than in FIG. 7a (DSF+SSMF). Finally, FIG. 7 shows that the variation of the soliton power with average dispersion is lowest for low δ. For systems using WDM, this gives an equalisation of the power in adjacent channels.

The region marked "higher order solutions" in FIG. 5 corresponds to a situation where the length of the anomalous dispersion fibre is longer than a soliton period. This region is excluded in FIG. 5 partly for the sake of clarity but also because in the variational approximation; the same solution can always be achieved by a shorter anomalous fibre, i.e. with lower average dispersion.

Thus asymmetric dispersion maps can be used to optimise the performance of dispersion managed soliton systems. In particular, a system with SSMF compensated by DCF has higher soliton power, gives more bandwidth in normal average dispersion, and results in an equalisation of the channel power in WDM systems compared to symmetric systems and systems using dispersion-shifted fibres.

Figure 8A:
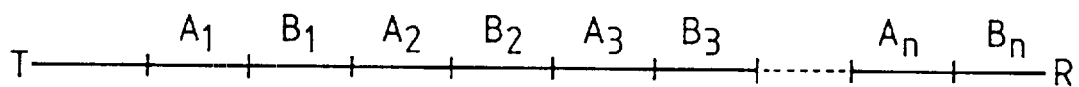
FIG. 8 is a schematic diagram showing a soliton or soliton-like communication system in accordance with a specific aspect of the invention.
Figure 8B:
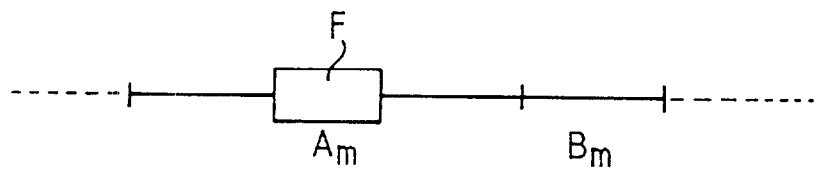
Figure 8C:
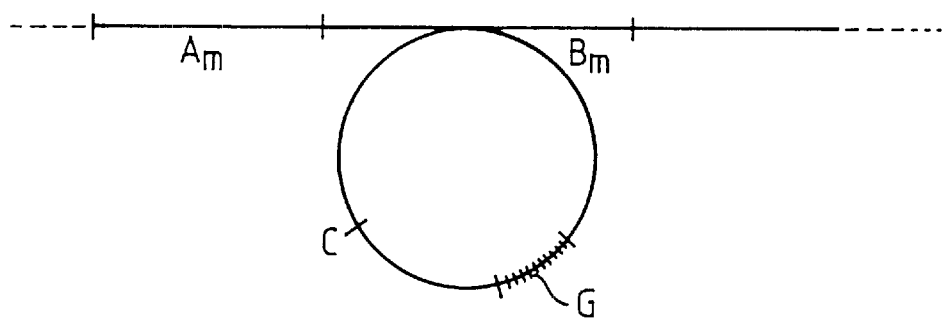

A soliton-based communications system is shown in FIG. 8. This comprises a source of solitons T and an optical waveguide consisting of successive elements $A_1$, $B_1$–$A_n$, $B_n$ having successively normal and anomalous dispersion. The elements $B_1$ etc. provide compensation for the dispersion in the elements $A_1$. The normal dispersive elements may be provided with a bandpass filter (FIG. 8b), ideally in the centre of the element where the bandwidth is minimum. Such filters will permit relaxation of the eparameter S so that S=2 is suitable with appropriate filters inserted. Dispersion compensation may be performed either with fibres having anomalous dispersion or with linear elements such as Bragg gratings G (FIG. 8c). In such an arrangement it will be necessary to provide a circulator C.

Dispersion management as herein described permits operation exactly at zero dispersion for a very high speed single channel or wavelngth division multiplexing around the zero dispersion point. If WDM around zero dispersion is employed, care is needed to avoid channels with identical group velocities. If this cannot be avoided it will be necessary to include a 'double' step around the centre of the system.

Dispersion slope compensation may take place, either in the compensating element or periodically or at the end of the system. Sinusoidal variations in dispersion are also suitable for all the situations described above.

What is claimed is:

1. A wavelength division multiplex optical communication system, including an optical fiber comprising a sequence of fiber sections, the sequence comprising an alternating sequence of a first section type having a normal dispersion (β1) followed by a second section type having an anomalous dispersion (β2), and wherein the average dispersion of the optical fiber is closer to zero than the magnitudes of the first and second dispersions, and wherein the wave length division multiplex system comprises a plurality of wave length channels positioned about a wave length associated with zero dispersion in the optical fiber.

2. A system according to claim 1, wherein the magnitudes of the first and second dispersions are significantly greater than the magnitude of the average dispersion of the fiber so that a soliton propagates through the fiber alternately expanding and compressing in shape as it propagates from one fiber section to the next.

3. A system according to claim 1, wherein said first section type has an associated length ($L_1$) and a first anomalous coefficient ($\gamma_1$) and said second type has a second associated length ($L_2$) and a second non-linear coefficient ($\gamma_2$), and wherein the map asymmetry (δ) is given by the ratio $(\gamma_1/\gamma_1)/(\gamma_2/\gamma_2)$, and the map asymmetry has a value as to permit wave length division multiplexing about a wave length associated with zero dispersion in the optical fiber.

4. A system according to claim 1, wherein the map asymmetry has a value of less than 1.

5. A system according to claim 4, wherein the first section type is single mode fiber and the second section type is dispersion compensation fiber.

6. A system according to claim 1, wherein it excludes channels having substantially equal group velocities, together with means to inhibit coalescence of solitons in said channels having substantially equal group velocities.

7. A system according to claim 1, wherein it includes at least one Bragg grating as a dispersion compensation element.

8. A system according to claim 1, characterized in that it includes a bandpass filter as a component of a normal dispersive element where the bandwidth is minimum.

9. A system according to claim 8, wherein said bandpass filter is positioned substantially in the center of said normal dispersive element.

10. A system according to claim 1, wherein the average dispersion of the fiber is zero.

11. A method of determining stable operating conditions in an optical communications system, the system comprising an optical fiber dispersion managed system comprising an alternating sequence of a first section type followed by a second section type, the first section type having an associated first length, a first normal dispersion value, a first non-linear co-efficient, and the second type having an associated second length, a second anomalous dispersion value, and a second non-linear co-efficient, wherein the magnitudes of the first and second dispersion values are large in relation to a small value of average dispersion in the system, the method comprising determining the map strength (S) of the dispersion managed system, determining the map asymmetry ($\delta$) from the ratio (first non-linear co-efficient/first dispersion)/(second non-linear co-efficient/second dispersion), and determining the peak power of a soliton pulse which can be transmitted from a consideration of the relation between the peak power, map strength, map asymmetry and map average dispersion.

12. A method according to claim 11, wherein a region is established for zero average dispersion in which wave length multiplexing can take place about the zero average value of dispersion.

13. An optical communication system arranged as a wavelength division multiplex system, and including an optical fiber dispersion management system comprising a sequence of fiber sections, the sequence comprising an alternating sequence of a first section type followed by a second section type, said first section type having an associated length ($L_1$), a first anomalous dispersion ($\beta_1$) and a first non-linear coefficient ($\gamma_1$), and of a second type having a second associated length ($L_2$), a second normal dispersion ($\beta_2$) and a second non-linear coefficient ($\gamma_2$), wherein the magnitudes of the first and second dispersions are significantly greater than the magnitude of the average dispersion of the fiber, whereby a soliton propagates through the system alternately expanding and compressing in shape as it propagates from one fiber section to the next, and wherein the average dispersion of the dispersion management system is zero.

14. A system according to claim 13, wherein the first section type is a length of single mode fiber.

15. A system according to claim 13, wherein the second section type is a length of dispersion compensation fiber.

16. A system according to claim 13, wherein the second section type is a Bragg grating and a circulator.

17. A system according to claim 13, wherein the first section type includes a bandpass filter.

18. An optical communication system arranged as a wavelength division multiplex system, and including an optical fiber dispersion management system comprising a sequence of fiber sections, the sequence comprising an alternating sequence of a first section type followed by a second section type, said first section type having an associated length ($L_1$), a first anomalous dispersion ($\beta_1$) and a first non-linear coefficient ($\gamma_1$), and of a second type having a second associated length ($L_2$), a second normal dispersion ($\beta_2$) and a second non-linear coefficient ($\gamma_2$), wherein the magnitudes of the first and second dispersions are significantly greater than the magnitude of the average dispersion of the fiber, whereby a soliton propagates through the system alternately expanding and compressing in shape as it propagates from one fiber section to the next, and wherein the average dispersion of the dispersion management system is normal.

19. A system according to claim 18, wherein the first section type is a length of single mode fiber.

20. A system according to claim 18, wherein the second section type is a length of dispersion compensation fiber.

21. A system according to claim 18, wherein the second section type is a Bragg grating and a circulator.

22. A system according to claim 18, wherein the first section type includes a bandpass filter.

23. An optical communication system comprising:

a plurality of optical sections wherein the optical sections alternately have dispersions of opposite sign, and wherein the plurality of optical sections allows propagation of stable or quasi-stable optical pulses under normal average dispersion.

24. An optical communication system according to claim 23, wherein the plurality of optical sections allows propagation of stable or quasi-stable optical pulses under anomalous average dispersion.

25. An optical communication system according to claim 23, wherein the plurality of optical sections allows propagation of stable or quasi-stable optical pulses under zero or substantially zero average dispersion.

26. An optical communication system according to claim 23, wherein said system is a wavelength division multiplex system having a plurality of channels operable about a wavelength having substantially zero average dispersion.

27. An optical communication system according to claim 26, wherein no two of said channels have substantially equal group velocities.

28. An optical communication system according to claim 23, wherein the optical sections have dispersions and optical path lengths that follow an asymmetric dispersion map.

29. An optical communication system according to claim 23, further comprising at least one non-fiber dispersion compensating element.

30. An optical communication system according to claim 23, further comprising at least one optical fiber dispersion compensating element.

31. An optical communication system according to claim 23, wherein the dispersion of each optical section varies along the length of the section so that the dispersion along the plurality of optical sections varies sinusoidally.

32. An optical communication system according to claim 23, wherein the duration $\tau$ of an optical pulse in a section is substantially equal to $\frac{1}{4}\beta$ l where $\beta$ is the dispersion of the section and l is the length of the section.

* * * * *

UNITED STATES PATENT AND TRADEMARK OFFICE
CERTIFICATE OF CORRECTION

PATENT NO. : 6,738,542 B1
APPLICATION NO. : 09/494246
DATED : May 18, 2004
INVENTOR(S) : Nicholas John Doran and Jeroen Henricus Bernardus Nijhof It is certified that error appears in the above-identified patent and that said Letters Patent is hereby corrected as shown below:

ON THE TITLE OF THE PATENT:

Under "Foreign Application Priority Data", the first foreign application priority listed:

Delete "1997" and replace with --1998--.

(30) Foreign Application Priority Data

Jul. 30, ~~1997~~ 1998 (GB)..........................9802291

Signed and Sealed this

Twenty-third Day of February, 2010

David J. Kappos
*Director of the United States Patent and Trademark Office*